(12) United States Patent
Kim et al.

(10) Patent No.: US 9,537,589 B2
(45) Date of Patent: Jan. 3, 2017

(54) METHOD OF CREATING PREAMBLE, AND METHOD AND APPARATUS FOR DETECTING FRAME BOUNDARY

(71) Applicant: Electronics and Telecommunications Research Institute, Daejeon (KR)

(72) Inventors: Byoung Hak Kim, Daejeon (KR); Jaehwan Kim, Daejeon (KR); Mi Kyung Oh, Daejeon (KR); Cheol-ho Shin, Daejeon (KR); Sangsung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 286 days.

(21) Appl. No.: 14/245,550

(22) Filed: Apr. 4, 2014

(65) Prior Publication Data

US 2014/0301412 A1   Oct. 9, 2014

(30) Foreign Application Priority Data

Apr. 5, 2013  (KR) .......................... 10-2013-0037691
Apr. 3, 2014  (KR) .......................... 10-2014-0040209

(51) Int. Cl.
| | | |
|---|---|---|
| *H04J 3/00* | (2006.01) | |
| *H04J 3/06* | (2006.01) | |
| *H04L 27/26* | (2006.01) | |
| *H04L 5/00* | (2006.01) | |

(52) U.S. Cl.
CPC ......... *H04J 3/0602* (2013.01); *H04L 27/2656* (2013.01); *H04L 27/2671* (2013.01); *H04L 27/2675* (2013.01); *H04L 27/2692* (2013.01); *H04L 5/0048* (2013.01)

(58) Field of Classification Search
CPC .......................... H04L 27/261; H04L 27/2655
See application file for complete search history.

(56) References Cited

U.S. PATENT DOCUMENTS

| | | | |
|---|---|---|---|
| 8,948,284 B2* | 2/2015 | Park ..................... | H04L 27/2613 375/259 |
| 2009/0190686 A1 | 7/2009 | Cheong et al. | |
| 2009/0285339 A1* | 11/2009 | Zhang ................. | H04J 13/0014 375/343 |

(Continued)

FOREIGN PATENT DOCUMENTS

KR         101006395 B1        12/2010

OTHER PUBLICATIONS

Jaehwan Kim et al., "Comment on OFDM LTF sequence and its resolution," IEEE P802.15 Working Group for Wireless Personal Area Networks(WPANs), Apr. 2013, pp. 1-8, IEEE.

*Primary Examiner* — Shaq Taha
(74) *Attorney, Agent, or Firm* — William Park & Associates Ltd.

(57) ABSTRACT

A method and apparatus of detecting a frame boundary by using a preamble are provided. The method includes delaying the preamble by a predetermined length of time, wherein the preamble includes an LTF and a code of the (n+1)th one of 2n sync sequences of the LTF is the inverse of a code of the last one of the sync sequences of STF; calculating a correlation value between the preamble and the delayed preamble; and detecting a frame boundary by comparing the correlation value with a threshold correlation value.

5 Claims, 10 Drawing Sheets

(56) References Cited

U.S. PATENT DOCUMENTS

| | | | |
|---|---|---|---|
| 2011/0051747 A1* | 3/2011 | Schmidl | H04L 27/2613 370/474 |
| 2012/0320889 A1* | 12/2012 | Zhang | H04L 1/004 370/338 |
| 2014/0199991 A1* | 7/2014 | Mukherjee | H03M 13/6525 455/422.1 |

* cited by examiner

METHOD OF CREATING PREAMBLE, AND METHOD AND APPARATUS FOR DETECTING FRAME BOUNDARY

CROSS-REFERENCE TO RELATED APPLICATION

This application claims priority to and the benefit of Korean Patent Application Nos. 10-2013-0037691 and 10-2014-0040209 filed in the Korean Intellectual Property Office on Apr. 5, 2013 and Apr. 3, 2014, the entire contents of which are incorporated herein by reference.

BACKGROUND OF THE INVENTION (a) Field of the Invention

The present invention relates to a method of creating a preamble, and a method and apparatus for detecting a frame boundary using a preamble.

(b) Description of the Related Art

In recent years, an orthogonal frequency division multiplexing (OFDM) system has been widely used in wireless communication systems because it makes efficient use of limited frequency resources and offers high-data transmission rates.

In IEEE 802.15.4m, which is currently under standardization, a short training field (STF) and a long training field (LTF) are used as a preamble. The STF included in the preamble of IEEE 802.15.4m has a pattern that repeats itself n times within an OFDM symbol. Thus, a device that has received the preamble can estimate the boundary of the OFDM symbol. However, it is not easy to detect the boundary of an OFDM symbol only by a repeating pattern of STFs.

SUMMARY OF THE INVENTION

The present invention has been made in an effort to provide a method of creating an LTF by which a frame boundary is effectively detected, and a method and apparatus for detecting a frame boundary through the LTF.

An exemplary embodiment of the present invention provides a method of creating a preamble including an STF and a LTF. The preamble creation method may include: determining frequency domain sequences of the LTF by taking into account the code of the last one of the frequency domain sequences of the STF; multiplexing the frequency domain sequences of the STF and the frequency domain sequences of the LTF; and transforming the multiplexed frequency domain sequences of the STF and the LTF into time domain signals by inverse discrete Fourier transform (IDFT).

The determining may include determining the code of an (n+1)th one of 2n frequency domain sequences of the LTF to be the inverse of the code of the last one of the frequency domain sequences of the STF.

The determining may include determining frequency domain sequences of the LTF by using a Monte Carlo method.

The preamble creation method may further include inserting cyclic prefixes (CPs) for the STF and the LTF into time domain signals.

Another exemplary embodiment of the present invention provides a method of detecting a frame boundary by using a preamble including a STF and an LTF. The frame boundary detection method may include: delaying a preamble by a predetermined length of time; calculating a correlation value between the preamble and the delayed preamble; and detecting a frame boundary by comparing the correlation value with a threshold correlation value, wherein a number of frequency domain sequences of the LTF is 2n, and a code of an (n+1)th one of the frequency domain sequences of the LTF is the inverse of a code of the last one of the frequency domain sequences of the STF.

The delaying may include delaying the preamble by a time period of 16 samples.

The calculating may include calculating the correlation value between a complex conjugate of the preamble and the delayed preamble.

The detecting may include detecting a frame boundary at a position where the correlation value becomes smaller than the threshold.

Another exemplary embodiment of the present invention provides an apparatus of detecting a frame boundary by using a preamble including an STF and an LTF. The frame boundary detection apparatus may include: a signal delay unit for delaying the preamble by a predetermined length of time; a correlation value calculator for calculating a correlation value between the preamble and the delayed preamble; and a boundary detector for detecting a frame boundary by comparing the correlation value with a threshold correlation value, wherein a number of frequency domain sequences of the LTF is 2n, and a code of the (n+1)th one of the frequency domain sequences of the LTF is the inverse of a code of the last one of the frequency domain sequences of STF.

The signal delay unit may delay the preamble by a time period of 16 samples.

The correlation value calculator may calculate the correlation value between a complex conjugate of the preamble and the delayed preamble.

The boundary detector may detect a frame boundary at a position where the correlation value becomes smaller than the threshold.

According to an exemplary embodiment of the present invention, the disadvantages of the conventional LTF, which is not suitable for detecting a frame boundary by calculating correlation values, can be overcome, thereby increasing the probability of OFDM symbol boundary detection. That is, using an LTF according to an exemplary embodiment of the present invention can increase the probability of frame boundary detection from a detection point with low complexity.

DETAILED DESCRIPTION OF THE EMBODIMENTS

Figure 1:
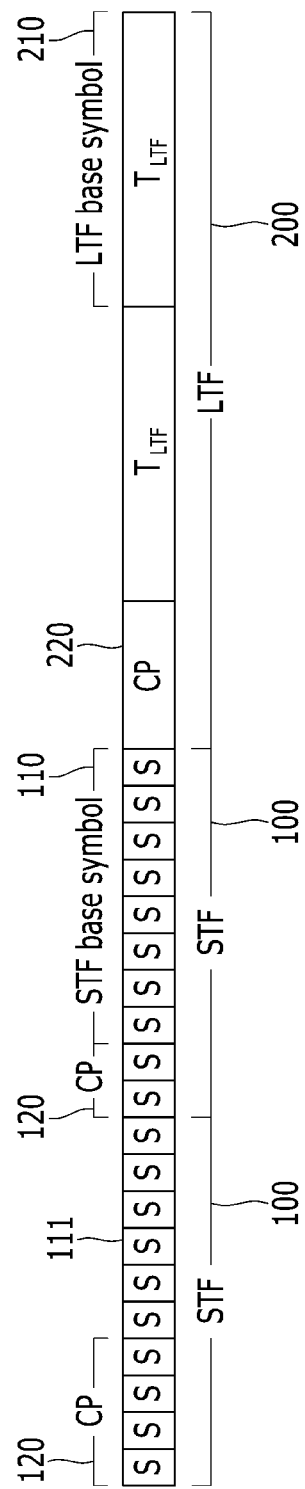
FIG. 1 is a view showing a preamble of IEEE 802.15.4m in a time domain.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, unless explicitly described to the contrary, the word "comprise" and variations such as "comprises" or "comprising" will be understood to imply the inclusion of stated elements but not the exclusion of any other elements. The terms "unit," "-er (-or)," "module," and the like described in the specification refer to units for performing at least one function or operation and can be embodied by software, by hardware such as a microprocessor, or by a combination of hardware and software.

FIG. 1 is a view showing a preamble of IEEE 802.15.4m in the time domain.

An OFDM symbol of IEEE 802.15.4m includes a base symbol (102.4 μs) and a cyclic prefix (CP; 25.6 μs).

Referring to FIG. 1, a preamble of IEEE 802.15.4m includes an STF OFDM symbol (hereinafter, 'STF') and an LTF OFDM symbol (hereinafter, 'LTF'). The STF may be repeated successively one to four times and may include STF base symbol 110 and a CP 120 for STF. The LTF 200 may include two LTF base symbols 210 and a CP 220.

The number of samples of one STF base symbol 110 and LTF base symbol 200 is 128. In this case, the duration of the CP for the STF 100 is ¼ of the duration STF base symbol 110, and the duration of the CP for the LTF 200 is ½ of the duration of LTF base symbol 210. Thus, the number of samples of the CP 120 for the STF base symbol 110 is 32, and the number of samples of the CP 220 for the LTF base symbol 210 is 64.

In the preamble of IEEE 802.15.4m, multiplexed frequency domain sequences of STF and LTF may be transformed to time domain signals by inverse discrete Fourier transform (IDFT), and then CPs may be inserted into the time domain signals of STF and LTF.

Frequency domain sequences $F_{STF}(k)$ of an STF base symbol 110 included in the preamble of IEEE 802.15.4m are as shown in the following Equation 1. 128 tones are numbered from DC(0) to 63 and −64 to −1.

$F_{STF}(k)=\sqrt{2}\times[0, 0, 0, 0, 0, 0, 0, 0, -1.0000-1.0000i,$
$0, 0, 0, 0, 0, 0, 0, -1.0000-1.0000i, 0, 0, 0, 0,$
$0, 0, 0, 1.0000+1.0000i, 0, 0, 0, 0, 0, 0, 0,$
$1.0000+1.0000i, 0, 0, 0, 0, 0, 0, 0, 1.0000+$
$1.0000i, 0, 0, 0, 0, 0, 0, 0, 1.0000+1.0000i, 0,$
$0, 0, 0, 0, 0, 0, 0, 0, 0, 0, 0, 0, 0, 0, 0, 0, 0,$
$0, 0, 0, 0, 0, 0, 0, 0, 0, 0, 0, 0, 1.0000+1.0000i,$
$0, 0, 0, 0, 0, 0, 0, -1.0000-1.0000i, 0, 0, 0, 0,$
$0, 0, 0, 1.0000+1.0000i, 0, 0, 0, 0, 0, 0, 0,$
$-1.0000-1.0000i, 0, 0, 0, 0, 0, 0, 0, -1.0000-$
$1.0000i, 0, 0, 0, 0, 0, 0, 0, 1.0000+1.0000i, 0,$
$0, 0, 0, 0, 0]$  (Equation 1)

Frequency domain sequences $F_{LTF}(k)$ of an LTF 130 included in the preamble of IEEE 802.15.4m draft document of march, 2013 are as shown in the following Equation 2. In this case, 128 tones are numbered from DC(0) to 63 and −64 to −1.

$F_{LTF}(k)=[0, -1, -1, 1, 1, -1, 1, 1, -1, -1, 1, 1, -1,$
$1, -1, -1, 1, 1, 1, 1, 1, -1, -1, 1, 1, -1, 1, -1,$
$1, 1, 1, -1, 1, 1, -1, -1, 1, 1, -1, 1, -1, 1, -1,$
$-1, -1, -1, -1, 1, 1, -1, -1, 1, -1, 1, -1, 0, 0,$
$0, 0, 0, 0, 0, 0, 0, 0, 0, 0, 0, 0, 0, 0, 0, 1,$
$1, -1, 1, -1, 1, 1, 1, 1, 1, -1, -1, -1, 1, 1, -1,$
$1, -1, 1, 1, 1, 1, 1, 1, -1, -1, 1, 1, 1, -1, -1, 1,$
$-1, -1, -1, -1, -1, 1, 1, -1, -1, 1, -1, 1, -1, 1,$
$1, 1, -1, -1, -1, -1, 1, -1]$  (Equation 2)

In this case, signals $t_{stf}(n)$ and $t_{ltf}(n)$ in the time domain, which are obtained by taking the inverse discrete Fourier transform of the sequences of the STF 110 and the sequences of the LTF 130, are as shown in Equation 3 and Equation 4, respectively.

$$t_{stf}(n) = \frac{1}{\sqrt{128}}\sum_{k=0}^{127} F_{STF}(k)e^{\frac{j2\pi kn}{N}}, 0 \leq n \leq 127 \quad \text{(Equation 3)}$$

$$t_{ltf}(n) = \frac{1}{\sqrt{128}}\sum_{k=0}^{127} F_{LTF}(k)e^{\frac{j2\pi kn}{N}}, 0 \leq n \leq 127 \quad \text{(Equation 4)}$$

Herein, the k values numbered from 0 to 63 correspond to tones numbered from 0 to 63 and the k values numbered from 64 to 127 correspond to tones numbered from −64 to −1, respectively.

Afterwards, the OFDM transmitter end boosts the signal amplitude of $t_{stf}(n)$ by 2 times and amplifies the average power of $t_{stf}(n)$ to 1.5 to transmit STF signals of the preamble. The OFDM transmitter end reduces the average power of $t_{ltf}(n)$ to about 0.8457 and transmits LTF signals of the preamble.

Referring to FIG. 1, both an STF base symbol 110 and an LTF base symbol 210 included in the preamble have duration of 128 samples. In the preamble of IEEE 802.15.4m, one STF 100 includes ten sync sequences (hereinafter, 'S') 111, and the first two 'S's of them correspond to a CP for the STF base symbol (the remaining eight 'S's) 110. Accordingly, one S 111 has duration of 16 samples.

In the preamble of IEEE 802.15.4m, the LTF 200 includes two LTF base symbols 210 and a CP 220. The CP 220 for the LTF 200 is equal to half of each LTF base symbol 210 (½ LTF=¼ LTF+¼ LTF).

As the OFDM receiver end demodulates data in units of OFDM symbols, it is important to find an accurate frame boundary per OFDM symbol. Since the code of the S 111 at the end of the STF base symbol 110 in FIG. 1 is not inverted, the frame boundary should be found using the correlation between the STF 100 and the LTF 200. In this case, the procedure of finding a frame boundary is referred to as frame boundary detection (FBD). FBD involves calculating the autocorrelation (AC) of an input signal or calculating the cross correlation (CC) between an input signal and the LTF 130 or STF 110.

The FBD method (first FBD method) of detecting a frame boundary by calculating a cross correlation is as follows. First, the correlation value $FBD_{CC}(i)$ is calculated according to Equation 5.

$$FBD_{CC}(i) = \sum_{k=0}^{15} FBD_{INPUT}(16 \times i + k) \times t_{LTF}(k)^* \quad \text{(Equation 5)}$$

Referring to Equation 5, $FBD_{CC}(i)$ is calculated by the cross correlation between an input signal ($FBD_{INPUT}$) including the STF 110 and the LTF 130, and the complex conjugate of the beginning portion of the LTF 130. In this case, $t_{LTF}$ is as shown in Equation 6.

$$t_{LTF}(k) = t_{ltf}(k+64),\ 0 \leq k \leq 15 \quad \text{(Equation 6)}$$

Referring to Equation 6, since the number of samples of an LTF 130 is 128, $t_{LTF}$ corresponds to 16 samples (numbered from 64 to 79) starting from the 65th sample (the first one of the 64th to 127th samples). Afterwards, when the absolute value of $FBD_{CC}(i)$ becomes greater than a threshold, FBD may be completed.

The FBD method of detecting a frame boundary by calculating a cross correlation is as follows (second FBD method). First, the autocorrelation value $FBD_{AC}(i)$ is calculated according to Equation 7.

$$FBD_{AC}(i) = \sum_{k=0}^{15} FBD_{INPUT}(16 \times i + k) \times FBD_{INPUT}(16 \times (i-1) + k)^* \quad \text{(Equation 7)}$$

Referring to Equation 7, $FBD_{AC}(i)$ is calculated by the autocorrelation between the complex conjugate of an input signal $FBD_{INPUT}$ including the STF 110 and the LTF 130, and an input signal obtained by delaying $FBD_{INPUT}$ by 16 samples. Afterwards, when the absolute value of $FBD_{AC}(i)$ becomes smaller than a threshold, FBD may be completed.

Figure 2:
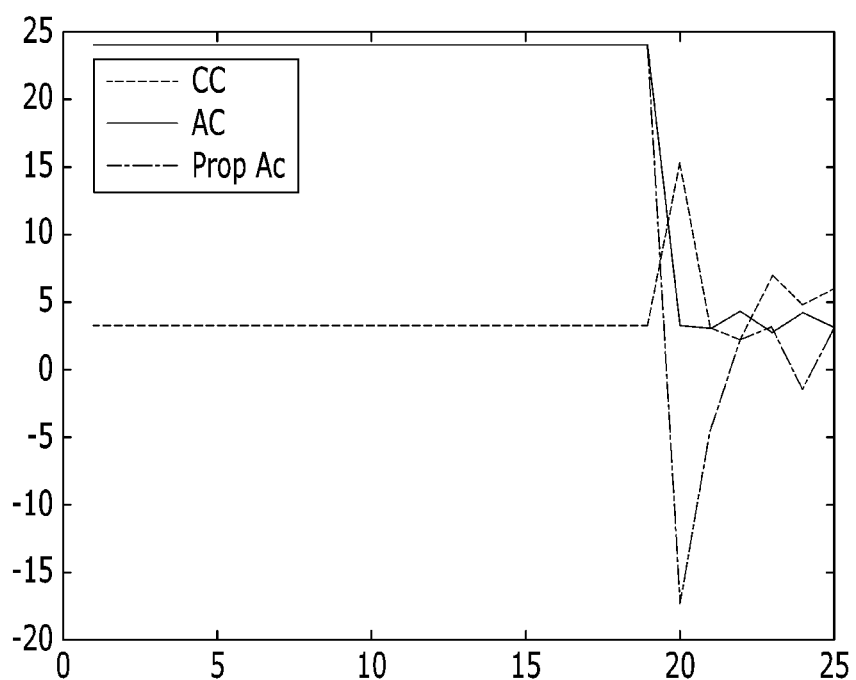
FIG. 2 is a graph showing a comparison of 16 tab correlation values in a FBD method according to an exemplary embodiment of the present invention.

FIG. 2 is a graph showing a comparison of 16 tab correlation values in an FBD method according to an exemplary embodiment of the present invention.

In the case of FBD according to Equations 5 to 7 using a conventional LTF, the code of a signal 'S' corresponding to 16 samples near the boundary of an STF and an LTF is not inverted, so that the correlation property is always positive, as shown in FIG. 2. Also, as can be seen from FIG. 2, the difference in correlation between the 19th and 20th samples on the x axis is not significant.

The absolute value of $FBD_{CC}$ in FIG. 2 ranges from 3 to 15, and the threshold is 10. The absolute value of $FBD_{AC}$ in FIG. 2 ranges from 3 to 24, and the threshold is set to 13. Lastly, the real part of $FBD_{BK}$ ranges from −17.5 to −24, and the threshold is set to 1.

Referring to FIG. 2, 'CC' denotes the absolute cross-correlation value, and 'AC' denotes the absolute autocorrelation value. The graph of FIG. 2 shows the results of a 16 tab correlation calculation performed every 16 samples.

An exemplary embodiment of the present invention proposes an LTF structure in which the real part of the correlation value between the beginning portion of an LTF OFDM symbol and a repeating pattern of STFs can be minimized. Once the real part of the correlation value between the beginning portion of LTF and an STF is minimized (the real part of the correlation value is negative and the absolute value of the real part of the correlation value is maximum), better performance than in the conventional FBD can be achieved under a similar condition. In the exemplary embodiment of the present invention, the length of the beginning portion of LTF may be determined according to the length of the repeating pattern of STFs.

LTFs created according to an exemplary embodiment of the present invention satisfy the following requirements.

According to IEEE 802.15.4m, the average power of LTF is 0.8457, and the average power of STF, obtained by boosting the average LTF power two times, is 1.5. The real and imaginary parts of an LTF value in the time domain is about 0.4228, and the maximum power of LTF is 3.1773 ($\approx 1.7825^2$). Taking this into consideration, the average power of LTFs created according to an exemplary embodiment of the present invention may be set to 0.8457, and the maximum power of LTF may be set to a value close to 3.1773 to reduce the PARR problem.

The autocorrelation value of 1/10 of STF is 24 according to the IEEE 802.15.4m standard, and therefore the cross correlation value of LTF and STF may be as close to −24 as possible. Afterwards, the created LTF and STF are multiplexed, and transformed into a time domain signal by inverse discrete Fourier transform.

Equation 8 represents a 16 tab LTF signal in the time domain created according to the exemplary embodiment of the present invention, and Equation 9 represents the cross correlation value of an STF (1/10 of an OFDM symbol) and the 16 tab LTF signal created according to the exemplary embodiment of the present invention.

$$p\_t_{ltf}(n) = \frac{1}{\sqrt{128}} \sum_{k=0}^{127} P\_F_{LTF}(k) e^{\frac{j2\pi k n}{128}}, \quad \text{(Equation 8)}$$

$$0 \leq n \leq 127$$

$$STF\_LTF_{CC} = \sum_{k=0}^{15} t_{stf}(k) \times p\_t_{ltf}(k+64)^* \quad \text{(Equation 9)}$$

In the exemplary embodiment of the present invention, 1 or −1 is input as the values of $P\_F_{LTF}(1)$ to $P\_F_{LTF}(54)$ and $P\_F_{LTF}(74)$ to $P\_F_{LTF}(127)$ so that the cross correlation value between the 64th to 79th signals (corresponding to the 65th to 80th sequences in the time domain) of $p\_t_{ltf}(n)$ and 1/10 of STF can be minimal. In this case, the number of ways of creating LTFs is $2^{104}$ because the number of available LTF signal in the frequency domain is 104. LTFs that can offer optimum performance while satisfying the above requirements are created by a Monte Carlo method or the like according to an exemplary embodiment of the present invention.

Figure 3:
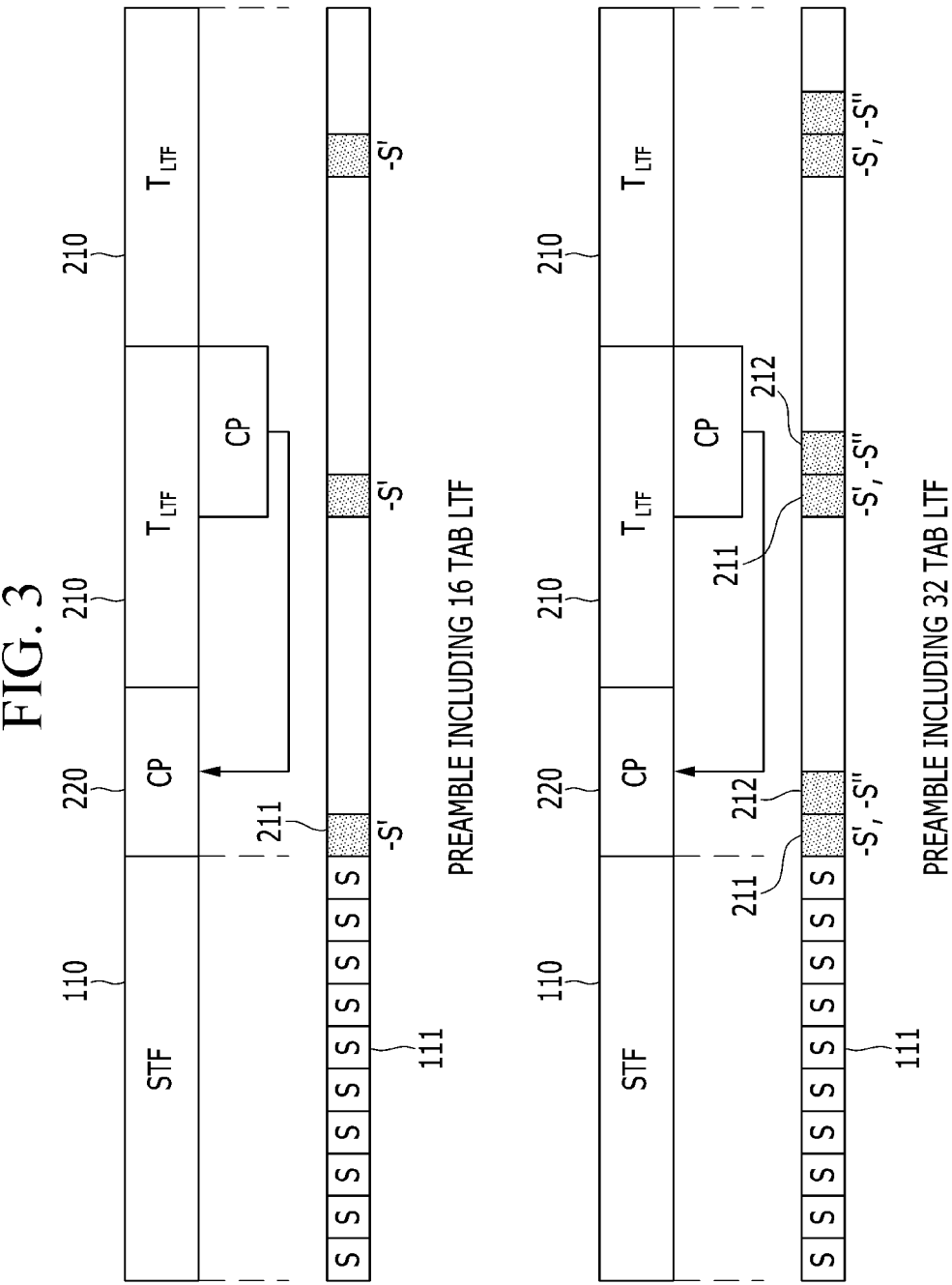
FIG. 3 is a view showing a preamble including 16 tab LTF and a preamble including 32 tab LTF according to an exemplary embodiment of the present invention.

FIG. 3 is a view showing a preamble including 16 tab LTF and a preamble including 32 tab LTF according to an exemplary embodiment of the present invention.

Referring to FIG. 3, an STF includes ten 'S's 111. In the preamble including 16 tab LTF, a −S' 211 of LTF is positioned next to the STF. In this case, the −S' 211 is the inverse of the code of the S' which is analogous to the S 111 of the STF 110. In the preamble including 32 tab LTF, −S' 211 and −S" 212 of LTF is positioned next to the STF. In this case, the −S' 211 and −S" 212 is the inverse of the code of the S' and S" which are analogous to the S 111 of the STF 110.

Frequency domain sequences ($F_{proposed\_LTF}(k)$) of a 16 tab LTF according to an exemplary embodiment of the present invention are as shown in Equation 10. 128 tones are numbered from DC(0) to 63 and −64 to −1.

$$\begin{aligned}F_{proposed\_LTF}(k)=[&0, -1, -1, -1, -1, -1, 1, 1, -1, -1,\\&1, -1, 1, -1, -1, -1, 1, -1, 1, -1, 1, -1, -1, -1,\\&-1, 1, 1, -1, 1, -1, 1, 1, -1, -1, -1, -1, -1, -1,\\&-1, 1, 1, 1, -1, 1, 1, 1, -1, -1, -1, -1, -1, -1,\\&-1, 1, -1, 0, 0, 0, 0, 0, 0, 0, 0, 0, 0, 0, 0, 0,\\&0, 0, 0, 0, 0, 1, -1, -1, 1, 1, -1, -1, 1, -1, 1,\\&-1, 1, 1, -1, 1, -1, 1, -1, 1, 1, -1, 1, 1, 1, -1,\\&1, -1, 1, -1, -1, -1, -1, 1, -1, -1, 1, -1, -1, 1,\\&1, 1, -1, 1, -1, 1, 1, -1, 1, -1, 1, 1, -1, 1, 1]\end{aligned}$$ (Equation 10)

"Proposed AC" of FIG. 2 indicates the real part of the autocorrelation value calculated using an LTF according to an exemplary embodiment of the present invention. By calculating the autocorrelation value using the LTF according to an exemplary embodiment of the present invention, an autocorrelation value of about −20 can be obtained from the 20th sample.

Figure 4:
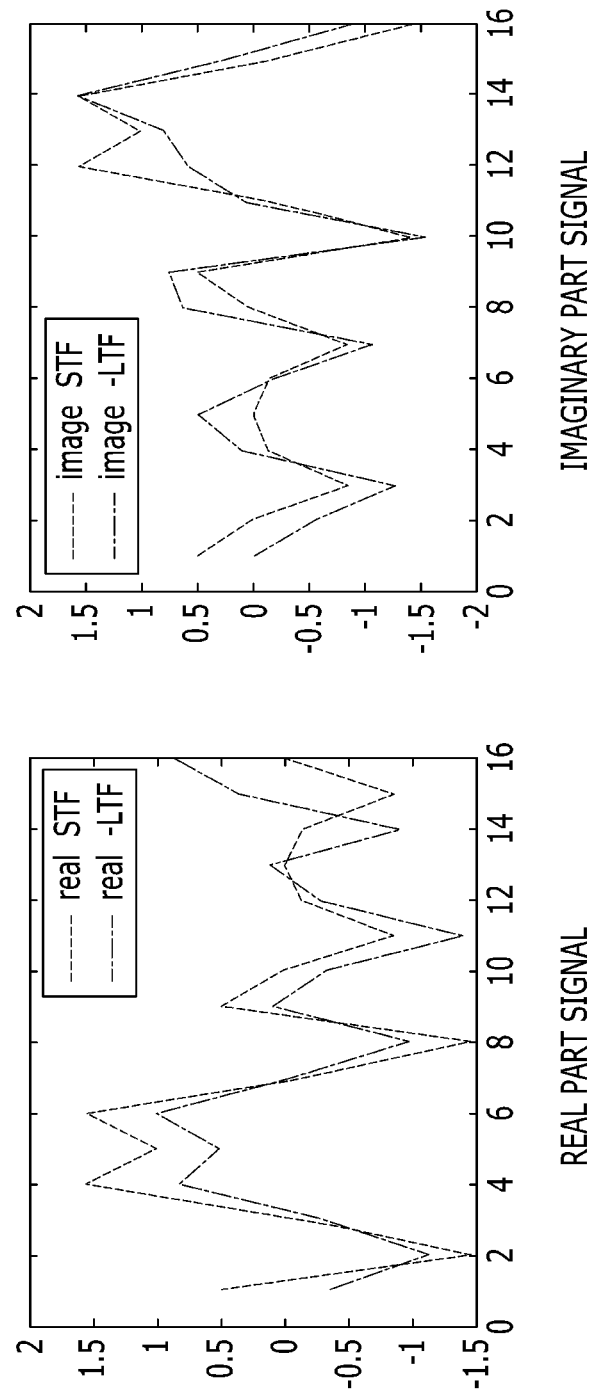
FIG. 4 shows graphs of the real and imaginary part signals of a 16 tab STF and a 16 tab LTF according to an exemplary embodiment of the present invention.

FIG. 4 shows graphs of the real and imaginary part signals of the STF and LTF according to an exemplary embodiment of the present invention.

FIG. 4 depicts the real and imaginary part signals of an OFDM symbol of STF and a value obtained by multiplying $\frac{1}{10}$ of an OFDM symbol of the LTF according to an exemplary embodiment of the present invention by −1. $65^{th}$ to $80^{th}$ samples (16 samples) obtained by performing IFFT on a frequency domain sequence were used as a $\frac{1}{10}$ portion of the LTF (128 samples) depicted in FIG. 4.

If a preamble signal including the STF and LTF according to an exemplary embodiment of the present invention is denoted by $FBD_{INPUT\_BK}$, the autocorrelation value $FBD_{BK}$(i) of $FBD_{INPUT\_BK}$ is as shown in Equation 11.

$$FBD_{BK}(i) = \sum_{k=0}^{15} FBD_{INPUT\_BK}(16 \times i + k) \times FBD_{INPUT\_BK}(16 \times (i-1) + k)^*$$ (Equation 11)

Referring to Equation 11, when the autocorrelation value between the complex conjugate of the input signal $FBD_{INPUT\_BK}$ and the input signal $FBD_{BK}$(i), obtained by delaying the input signal $FBD_{INPUT9\_BK}$ by 16 samples, is calculated, and the real part of $FBD_{BK}$(i) becomes smaller than a threshold, FBD may be completed. That is, Equation 11 explains an FBD method according to an exemplary embodiment of the present invention. Referring to FIG. 2, the real part of $FBD_{BK}$ slightly changes within the range of −17.5 to 24, and the smaller the real part, the better the performance.

Figure 5:
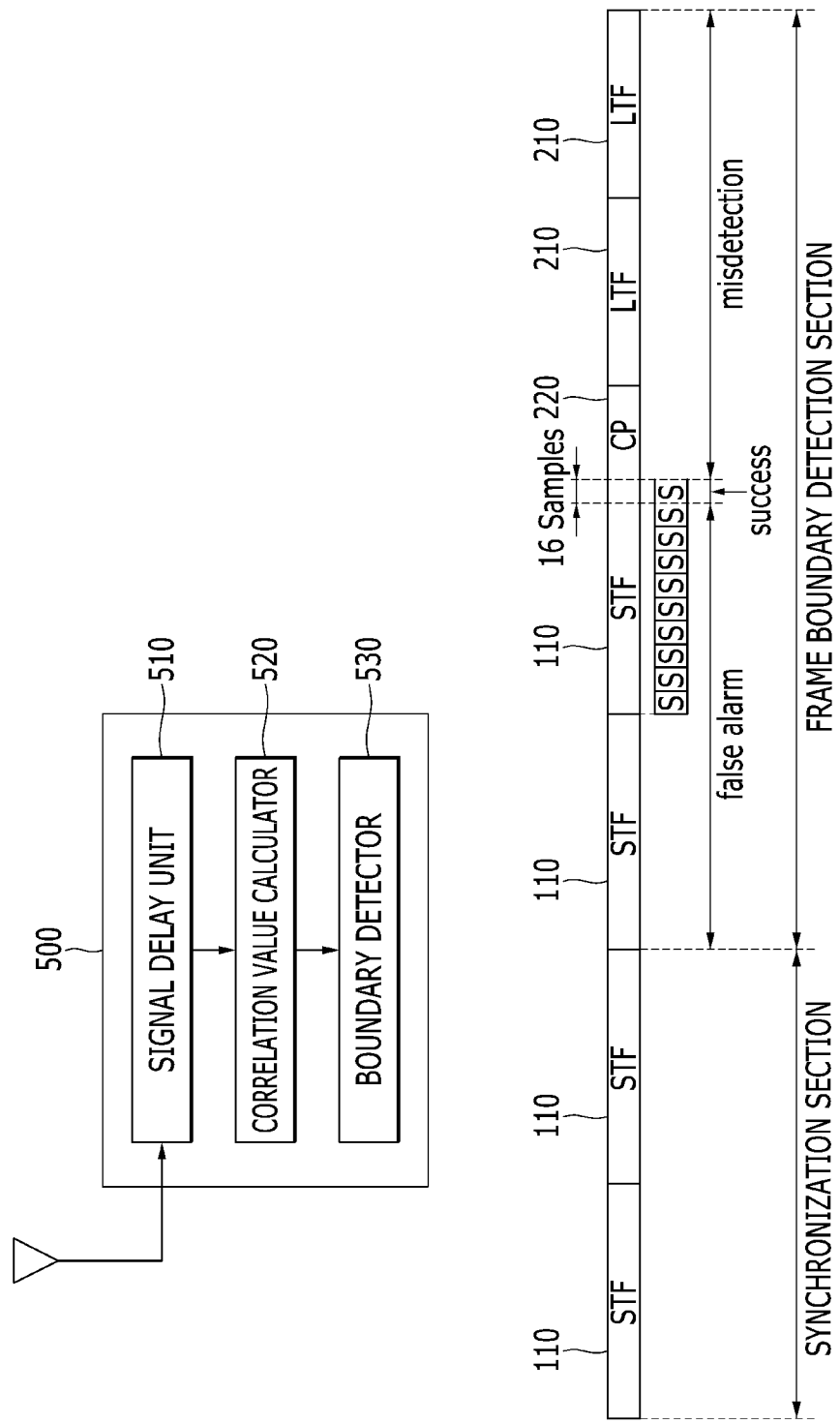
FIG. 5 is a view showing a receiver according to an exemplary embodiment of the present invention and an FBD method performed by the receiver.

FIG. 5 is a view showing a receiver according to an exemplary embodiment of the present invention and an FBD method performed by the receiver.

Referring to FIG. 5, an FBD method according to an exemplary embodiment of the present invention will be described below. First, a frame boundary is found through a pattern of 'S's at a point where two STFs are left. When a frame boundary is detected at the point of the 20th FBD calculation, this is regarded as "success", when a frame boundary is detected before the point in time of the 20th calculation, this is regarded "false alarm", and a frame boundary is detected after the 20th FBD calculation, this is regarded as "misdetection".

The receiver 500 according to the exemplary embodiment of the present invention may include a signal delay unit 510, a correlation value calculator 520, and a boundary detector 530.

The signal delay unit 510 delays a received signal, that is, a preamble including LTF according to the exemplary embodiment of the present invention, by a predetermined length of time. The signal delay unit 510 according to the exemplary embodiment of the present invention may delay the received signal by 16 samples.

The correlation value calculator 520 calculates the correlation value between the received preamble and a preamble obtained by delaying the received preamble. The correlation value calculator 520 according to the exemplary embodiment of the present invention may calculate the correlation value (autocorrelation value) between the last 16 samples ($\frac{1}{10}$ of an OFDM symbol) of the STF and the first 16 samples ($\frac{1}{10}$ of an OFDM symbol) of the LTF. Alternatively, a frame boundary may be detected by calculating the cross correlation value between a received signal and a known LTF.

The boundary detector 530 may detect a frame boundary by comparing the correlation value calculated by the correlation value calculator 520 with a threshold correlation value. If the correlation value becomes smaller than the threshold correlation value, the boundary detector 530 according to the exemplary embodiment of the present invention may detect the corresponding sample position as the frame boundary.

Figure 6:
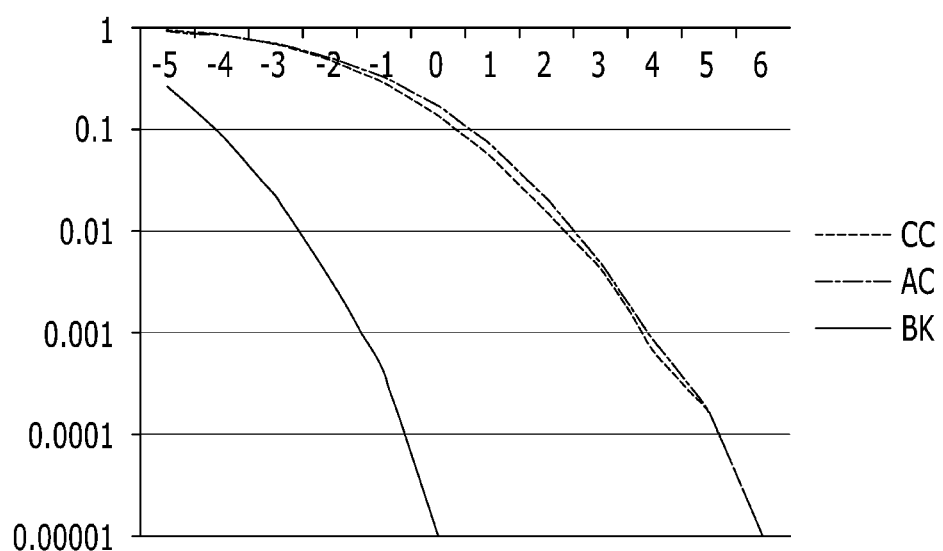
FIG. 6 is a graph showing the performance of an FBD method using a 16 tab LTF according to an exemplary embodiment of the present invention.

FIG. 6 is a graph showing the performance of an FBD method using the 16 tab LTF according to an exemplary embodiment of the present invention.

Referring to FIG. 6, it can be seen that the probability of FBD failure can be remarkably reduced by using the 16 tab LTF according to the exemplary embodiment of the present invention.

The FBD method according to the exemplary embodiment of the present invention supposes that additive white Gaussian noise (AWGN) is normalized to 0.8457, which is the average power of the LTF.

The graph of FIG. 6 supposes that each case represents a threshold value. Accordingly, the absolute value of $FBD_{CC}$ (first FBD method) is set to 10, the absolute value of $FBD_{AC}$ (second FBD method) is set to 13, and the real part of $FBD_{BK}$ (third FBD method) is set to 1.

Referring to FIG. 6, in the FBD method according to the exemplary embodiment of the present invention, it can be seen that the probability of FBD failure at all SNRs in the 16 tab cross-correlation calculation is lower than in the conventional method, and even with a slight increase in SNR, the probability of FBD failure converges to 0 at a much higher speed than the conventional FBD method.

Figure 7:
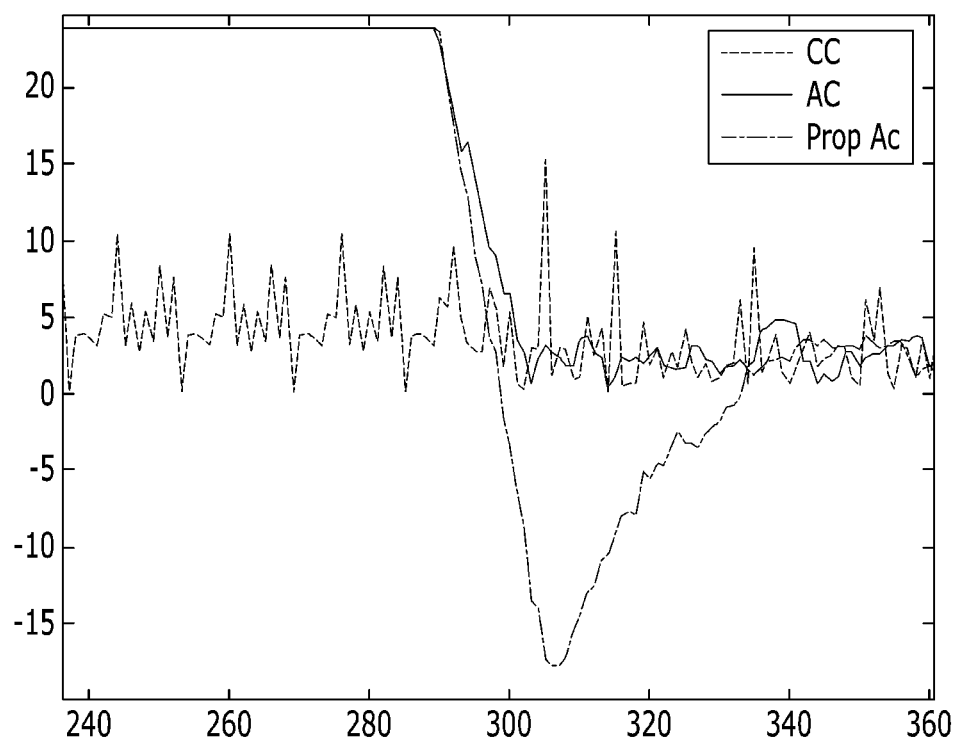
FIG. 7 is a graph showing 16 tab correlation values in an FBD method according to another exemplary embodiment of the present invention.

FIG. 7 is a graph showing 16 tab correlation values in an FBD method according to another exemplary embodiment of the present invention.

FIG. 2 is a graph showing a comparison of 16 tab correlation values calculated for every 16 samples. FIG. 7 is a graph showing a comparison of 16 tab correlation values calculated for every sample. According to the exemplary embodiment of the present invention, FBD can be performed by using the difference in correlation between the $289^{th}$ sample and the $307^{th}$ sample shown in FIG. 7. Referring to FIG. 7, it is anticipated that even if a timing error occurs due to increase in complexity caused by the calculation of the correlation value of each sample, the performance of "proposed AC" will not be deteriorated a lot.

Figure 8:
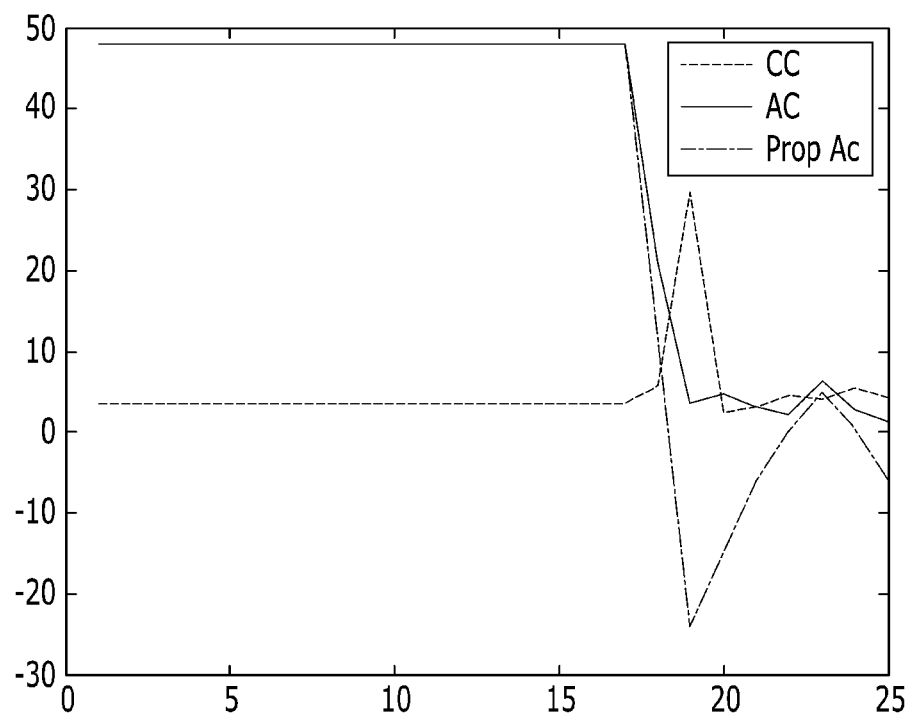
FIG. 8 is a graph showing a comparison of 32 tab correlation values in an FBD method according to an exemplary embodiment of the present invention.

FIG. 8 is a graph showing a comparison of 32 tab correlation values in an FBD method according to an exemplary embodiment of the present invention.

To increase the number of tabs for correlation value calculation from 16 samples to 32 samples, an LTF that helps minimize the cross correlation value (STF_LTF$_{CC\_64}$) between two 'S's included in an STF and the LTF is required. An LTF creator according to the exemplary embodiment of the present invention creates LTFs in such a way that the 32 tab correlation value STF_LTF$_{CC\_32}$ between 2/10 of an STF and 32 samples at the beginning portion of LTFs is close to −48, taking into account that the autocorrelation value of 2/10 of an STF is 48(1.5×32). Equation 12 represents a 32 tab LTF signal generated according to the exemplary embodiment of the present invention, and Equation 13 represents the cross correlation value of 2/10 of an STF and the 32 tab LTF signal created according to the exemplary embodiment of the present invention.

$$p\_t_{ltf}(n) = \frac{1}{\sqrt{128}} \sum_{k=0}^{127} P\_F_{LTF}(k) e^{\frac{j2\pi kn}{128}}, \quad \text{(Equation 12)}$$

$$0 \leq n \leq 127$$

$$STF\_LTF_{CC} = \sum_{k=0}^{31} t_{stf}(k) \times p\_t_{ltf}(k+64)^* \quad \text{(Equation 13)}$$

Equation 14 represents frequency domain sequences of the 32 tab LTF according to the exemplary embodiment of the present invention which is created by Equation 12 and Equation 13.

$F_{proposed\_LTF}(k)$=[0, −1, −1, 1, 1, −1, 1, 1, −1, −1, 1,
1, −1, 1, −1, −1, 1, 1, 1, 1, 1, −1, −1, 1, 1, −1,
1, −1, 1, 1, 1, −1, 1, 1, −1, −1, 1, 1, −1, 1, −1,
1, −1, −1, −1, −1, −1, 1, 1, −1, −1, 1, −1, 1, −1,
0, 0, 0, 0, 0, 0, 0, 0, 0, 0, 0, 0, 0, 0, 0, 0,
0, 1, 1, −1, 1, −1, 1, 1, 1, 1, −1, −1, −1, 1, 1,
−1, 1, −1, 1, 1, 1, 1, 1, 1, −1, −1, 1, 1, −1, 1,
−1, 1, −1, −1, −1, −1, −1, 1, 1, −1, −1, 1, −1, 1,
−1, 1, 1, 1, −1, −1, −1, −1, 1, −1]   (Equation 14)

$F_{proposed\_LTF}(k)$=[0, −1, 1, −1, 1, −1, −1, −1, 1, −1,
1, −1, −1, −1, −1, −1, 1, −1, 1, −1, 1, 1, 1, 1, −1,
−1, 1, −1, −1, 1, −1, 1, 1, −1, 1, 1, −1, −1, 1, −1,
1, −1, −1, 1, −1, 1, −1, 1, 1, −1, −1, 1, 1, 1, 1,
−1, 1, 0, 0, 0, 0, 0, 0, 0, 0, 0, 0, 0, 0, 0, 0, 0,
0, 0, 0, 1, −1, −1, −1, 1, −1, −1, 1,−1, −1, 1, 1,
−1, 1, 1, 1, 1, −1,−1, −1, 1, −1,−1, 1,−1, −1, 1,
1, −1, 1, 1, 1, 1, 1, −1, 1, 1, 1, 1, −1, 1, −1, 1,
−1, 1, −1, −1, 1, −1, 1, −1, 1, −1, −1]   (Equation 15)

Figure 9:
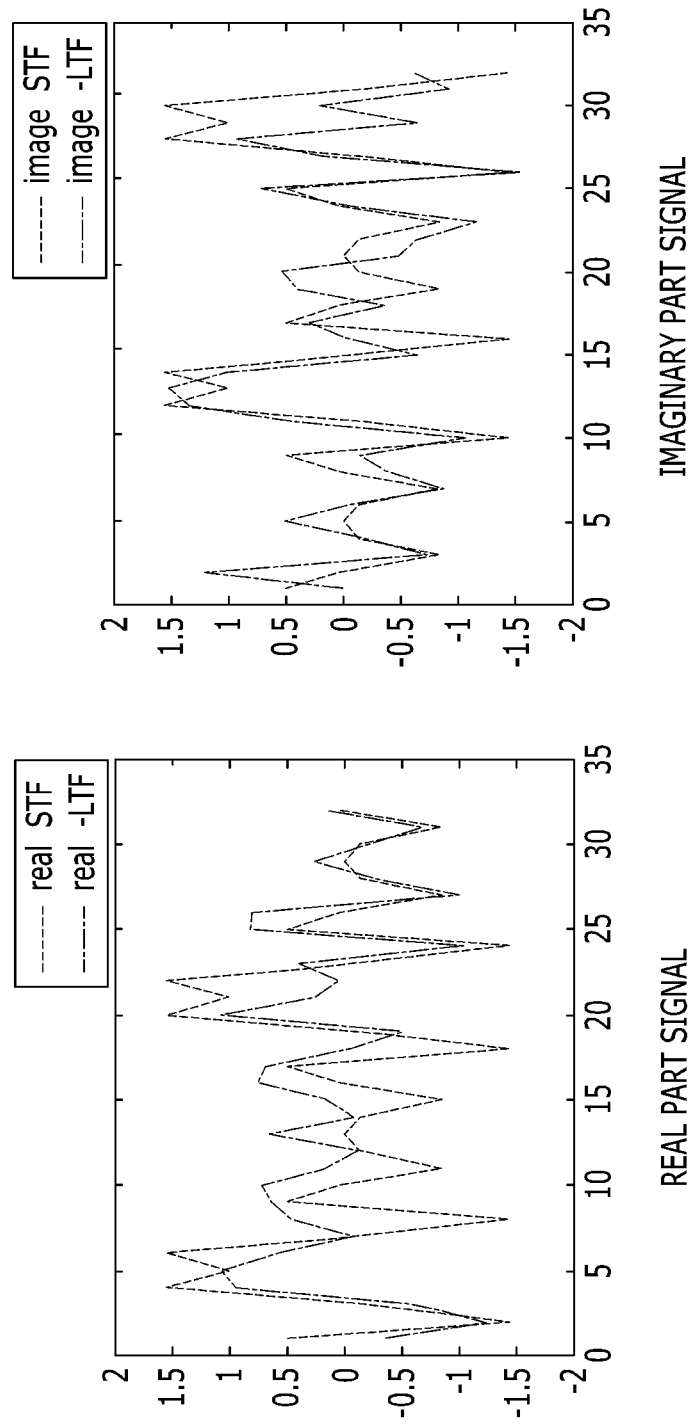
FIG. 9 shows graphs of the real and imaginary part signals of a 32 tab STF and a 32 tab LTF according to an exemplary embodiment of the present invention.

FIG. 9 shows graphs of the real and imaginary part signals of the 32 tab STF and the 32 tab LTF according to an exemplary embodiment of the present invention.

FIG. 9 depicts the real and imaginary parts of 2/10 of the STF and a value obtained by multiplying the first 2/10 of the LTF by −1. 65th to 96th samples (32 samples) obtained by taking IFFT on a frequency domain sequence were used as a 2/10 portion of the LTF (128 samples) depicted in FIG. 9.

Figure 10:
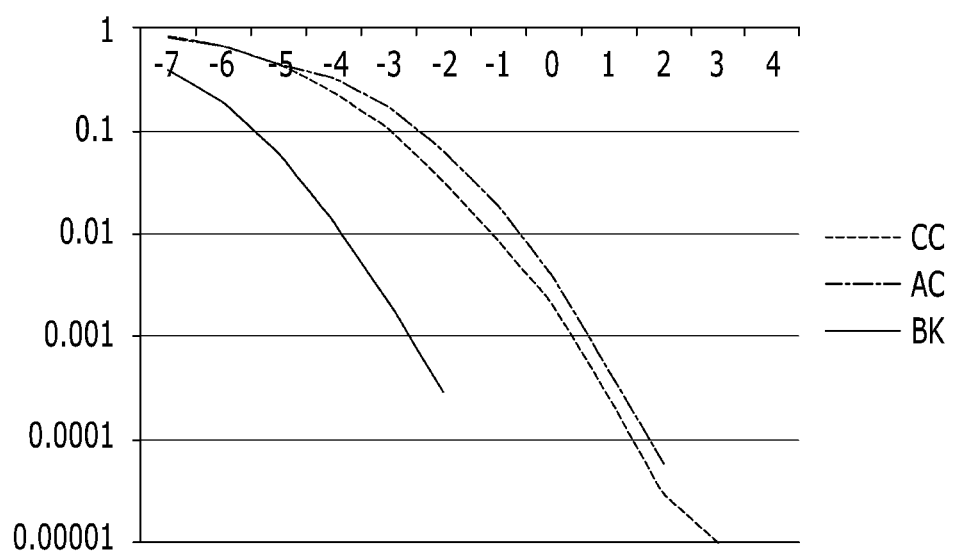
FIG. 10 is a graph showing the performance of an FBD method using a 32 tab LTF according to an exemplary embodiment of the present invention.

FIG. 10 is a graph showing the performance of an FBD method using the 32 tab LTF according to an exemplary embodiment of the present invention.

Referring to FIG. 10, it can be seen that the probability of FBD failure can be remarkably reduced by using the 32 tab LTF according to the exemplary embodiment of the present invention.

The graph of FIG. 10 supposes that each case represents a threshold value. Accordingly, the absolute value of FBD$_{CC}$ (first FBD method) is set to 18, the absolute value of FBD$_{AC}$ (second FBD method) is set to 25, and the real part of FBD$_{BK}$ (third FBD method) is set to 8.

Referring to FIG. 10, in the FBD method using the LTF according to the exemplary embodiment of the present invention, it can be seen that the probability of FBD failure at all SNRs in the 32 tab cross-correlation calculation is lower than in the conventional method, and even with a slight increase in SNR, the probability of FBD failure converges to 0 at a much higher speed than the conventional FBD method.

By using an LTF according to an exemplary embodiment of the present invention, the disadvantages of the conventional LTF, which are not suitable for detecting a frame boundary by calculating correlation values, can be overcome, thereby increasing the probability of OFDM symbol boundary detection. That is, using an LTF according to an exemplary embodiment of the present invention can increase the probability of frame boundary detection from a detection point with low complexity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of generating synchronization header (SHR) of orthogonal frequency division multiplexing (OFDM) frame, the method comprising:
   generating the SHR including sync sequence of a long training field (LTF), the generating including:
   multiplexing sync sequences of a short training field (STF) and the sync sequences of the LTF; and
   transforming the multiplexed sync sequences of the STF and the LTF into time domain signals by performing an inverse discrete Fourier transform (IDFT),
   wherein the sync sequence of the LTF in a frequency domain is [0, −1, 1, −1, 1, −1, −1, −1, 1, −1, 1, −1, −1, −1, −1, −1, 1, −1, 1, −1, 1, 1, 1, −1, −1, 1, −1, −1, 1, −1, 1, 1, −1, 1, −1, −1, 1, −1, 1, −1, −1, 1, −1, 1, 1, −1, −1, 1, 1, 1, 1, −1, 1, 0, 0, 0, 0, 0, 0, 0, 0, 0, 0, 0, 0, 0, 0, 0, 0, 0, 0, 1, −1, −1, −1, 1, −1, −1, 1, −1, −1, 1, 1, −1, 1, 1, 1, 1, −1, −1, −1, 1, −1, −1, 1, −1, −1, 1, 1, −1, 1, 1, 1, 1, 1, −1, 1, −1, 1, −1, 1, −1, −1, 1, −1, 1, −1, 1, −1, −1] in which 128 tones are numbered from DC(0) to 63 and −64 to −1.

2. The method of claim 1, further comprising determining sync sequences of the LTF by taking into account last sync sequence among sync sequences of a short training field (STF).

3. The method of claim 1, wherein the determining comprises determining the code of an (n+1)th one of 2n sync sequences of the LTF to be the inverse of the code of the last one of the sync sequences of the STF.

4. The method of claim 1, wherein the determining comprises determining sync sequences of the LTF by using a Monte Carlo method.

5. The method of claim 1, further comprising inserting cyclic prefixes (CPs) for the STF and the LTF into the time domain signals.

* * * * *